United States Patent [19]

Ebihara et al.

[11] 4,266,278

[45] May 5, 1981

[54] PORTABLE ELECTRONIC DEVICE EQUIPPED WITH CALCULATION AND TIMEKEEPING FUNCTIONS

[75] Inventors: Heihachiro Ebihara; Fukuo Sekiya, both of Tokorozawa; Takashi Yamada, Sayama, all of Japan

[73] Assignee: Citizen Watch Co., Ltd., Tokyo, Japan

[21] Appl. No.: 56,086

[22] Filed: Jul. 9, 1979

Related U.S. Application Data

[63] Continuation-in-part of Ser. No. 890,312, Mar. 27, 1978, abandoned.

[30] Foreign Application Priority Data

Mar. 30, 1977 [JP] Japan .................................. 52-39125
Apr. 8, 1977 [JP] Japan .................................. 52-40818

[51] Int. Cl.³ .................. G06F 3/02; G06F 15/02; G04B 47/00
[52] U.S. Cl. .................. 364/705; 340/365 E; 340/365 S; 364/707; 364/709; 368/10
[58] Field of Search .................. 364/705, 707, 709; 340/365 R, 365 E, 365 S; 58/23 R, 152 R; 368/10

[56] References Cited

U.S. PATENT DOCUMENTS

| | | | |
|---|---|---|---|
| 3,764,997 | 10/1973 | Hatano et al. | 340/365 S X |
| 3,987,437 | 10/1976 | Hatsukano et al. | 340/365 S |
| 4,041,295 | 8/1977 | Ido et al. | 364/705 |
| 4,094,135 | 6/1978 | Nomura et al. | 58/23 R |
| 4,106,011 | 8/1978 | Melanson et al. | 340/365 E |
| 4,109,315 | 8/1978 | Pan | 364/707 X |
| 4,117,758 | 10/1978 | Osburn et al. | 340/365 E X |

*Primary Examiner*—Jerry Smith

[57] ABSTRACT

A portable electronic device with calculation and timekeeping functions, equipped with a keyboard for calculation and time setting purposes, means for producing scanning signals when a key is actuated, these signals being applied to switching elements connected to rows of keyboard contacts. When a key is depressed, the resultant high level signal potential applied to the corresponding contact row causes the row position to be detected and stored in a first memory circuit, which produces a signal causing the corresponding contact column to be detected and stored in a second memory circuit. Actuation of an external control member causes a signal to be stored by a reset signal in a first stage memory circuit which produces an output signal to be subsequently stored in a second stage memory circuit in synchronism with a timing signal. The low frequency and low duty cycle of the scanning signals and reset signal ensure minimized power consumption and suppression of switch bounce effects.

6 Claims, 8 Drawing Figures

PORTABLE ELECTRONIC DEVICE EQUIPPED WITH CALCULATION AND TIMEKEEPING FUNCTIONS

REFERENCE TO PRIOR APPLICATION

This application is a continuation-in-part of a patent application Ser. No. 890,312 filed Mar. 27, 1978 and now abandoned.

FIELD OF INVENTION

This invention relates to input circuits for keyboards and control switches, and in particular to input circuits for a portable electronic device which can be utilized both as a calculator and as a timepiece, and which incorporates a keyboard and control switches.

BACKGROUND OF THE INVENTION

In recent years, portable electronic devices have been introduced which can perform the functions of both a calculator and a timepiece, some of these devices being designed to be worn on the wrist. Due to the small size of such devices, it is only possible to utilize a battery of relatively small size and capacity as a power source. It is therefore necessary to ensure that the power dissipation of the device shall be as low as possible.

Until now, the input circuit of the keyboard of such a portable electronic device, used to produce electrical signals to indicate that a key has been depressed and to identify the particular key, have been of similar design to the keyboard input circuits used in electronic calculators of conventional design. Such a type of circuit dissipates a relatively high level of power, and is not suitable for a device in which power consumption must be reduced to the lowest practicable degree. The above remarks are also applicable to the input circuits of external actuation members such as control switches, utilized to select the display of time information or calculation information, for example. Such input circuits must suppress spurious switch bounce pulses generated when switch contacts are closed.

SUMMARY OF THE INVENTION

The present invention is directed towards reducing the power dissipation of the input circuits of the keyboard and the external control members of a portable electronic device. In the preferred embodiment, matrix columns of a key contact matrix actuated by the keyboard keys are normally held at a low potential by being connected to the low potential terminal of the battery of the device, through impedance elements. Matrix rows of the key contact matrix are connected at one end to switching elements, so that the matrix rows are normally in a floating condition, electrically speaking, but are periodically connected to the high potential terminal of the device battery by the switching elements being periodically set in the conducting condition. The switching elements are set in the conducting condition by periodic scanning signals, which can have a very small duty cycle, 1/4000 for example. Thus, if a key is depressed, current flows from the high potential of the battery through a switching device and through matrix contacts into an impedance device. However, due to the low duty cycle of the signal which controls the switching element, the average current flowing while a key is depressed is extremely low. Memory circuits are provided into which information on the state of the matrix rows is read in synchronism with the switching elements being set into the conducting condition. Other memory circuits are used to store information on the condition of the matrix columns. The above two sets of information are encoded and output as DC signals in the case of the function keys, and as time serial data in the case of the numeric keys of the keyboard, referred to herein as the ten keys.

In the case of the input circuits of external actuating members such as switches, one side of each pair of switch contacts is connected to the high potential of the battery, while the other side is periodically connected to the low potential of the battery by a reset signal of low duty cycle, applied through a logic gate. The condition of the contact connected to the logic gate output is periodically registered in a flip-flop, so that the output of the flip-flop is normally at the low potential, but goes to the high potential if the corresponding switch contacts are closed. As in the case of the keyboard input circuit described above, the low duty cycle of the reset signal used serves to ensure very low average current being drawn from the device battery. Also, the relatively long period between each of the pulses of the reset signal ensures that switch bounce pulses have no effect. The output of memory circuits mentioned in the previous sentence are periodically registered in another set of memory circuits, to provide steady-state control signals which are synchronized with the internal circuit operation of the device.

It is therefore an object of the present invention to provide an improved portable electronic device which incorporates both timekeeping and calculation functions.

It is another object of the present invention to provide an improved portable electronic device which incorporates both timekeeping and calculation functions with improved keyboard input circuit means and improved external control member input circuit means whereby the power required for operation of said keyboard and external control members is significantly reduced by comparison with conventional means.

BRIEF DESCRIPTION OF DRAWINGS

These and other objects, features and advantages of the present invention will be more apparent from the following description when taken in conjunction with the accompanying drawings, wherein:

FIG. 2 which comprises

DESCRIPTION OF PREFERRED EMBODIMENT

Figure 1:
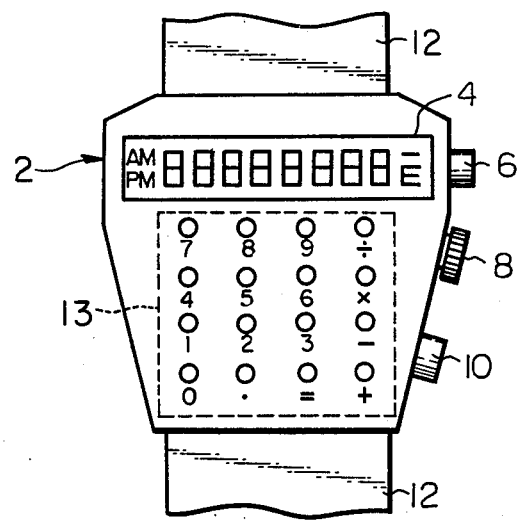
FIG. 1 is an external view of a portable electronic device in accordance with the present invention.

Referring now to the diagrams, FIG. 1 is an external view showing a portable electronic device 2 equipped with input circuits according to the present invention. The device shown in FIG. 1 can be attached to the wrist by means of a wristband, 12. Numeral 6 indicates a mode switch, adapted for switching between the calculation and the timepiece modes of operation of the device, and between the "hours, minutes, seconds" mode and the "year, month, date" mode while in the timepiece mode of operation. Numeral 4 denotes a display device adapted to display the mode selected by means of switch 6. Switch 8 is provided to perform a time setting lock function. When this switch is pulled outward from the device body it becomes possible to set the time information displayed on 4. Time setting is performed by inputting correction information from a keyboard, 13, which is normally utilized to input calculation data. Another switch, 10, is used as a clear key in the calculation mode of operation, and is used to reset the seconds of the time information to zero during time correction in the timepiece mode of operation.

Figure 2A:
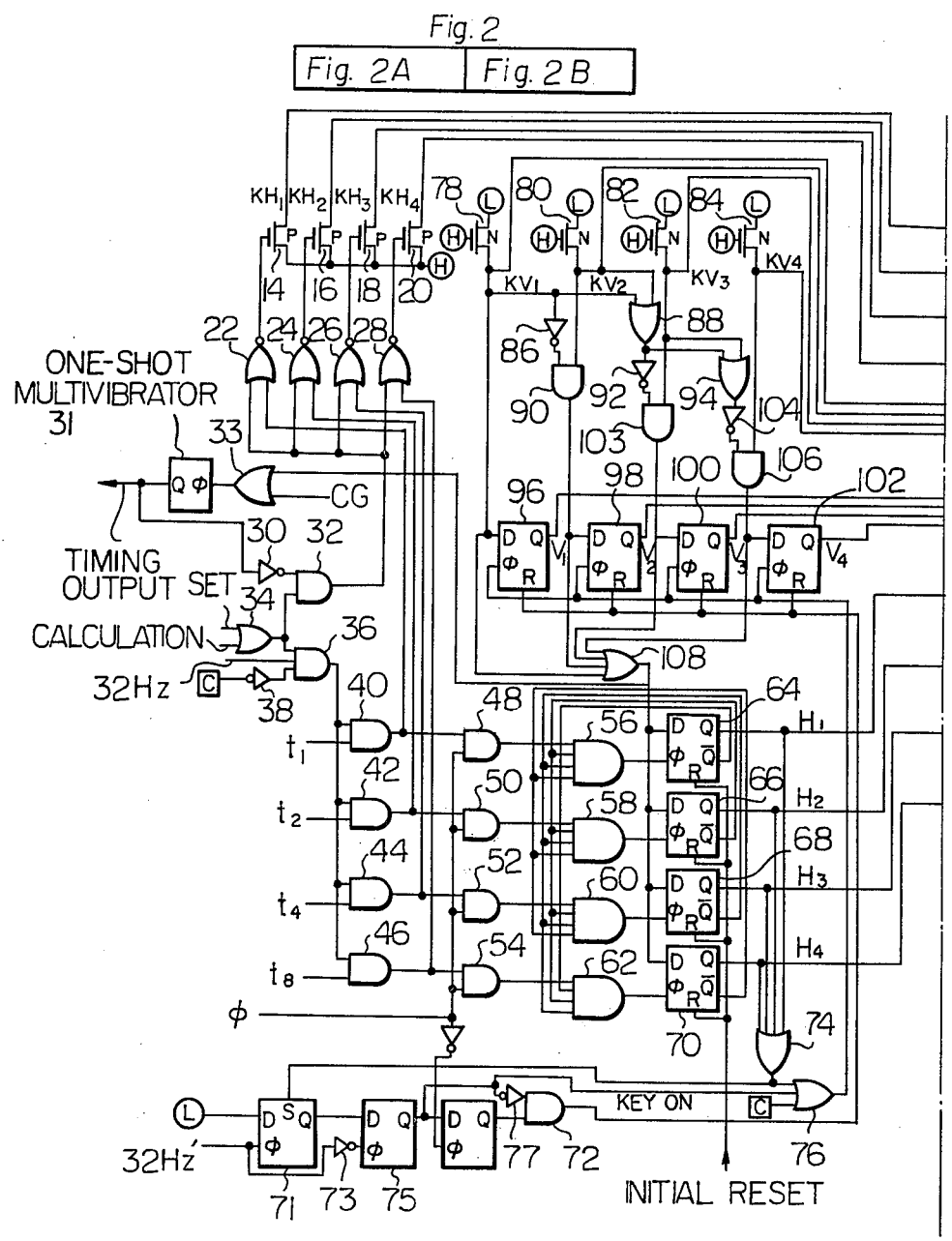
FIGS. 2A and 2B shows a keyboard input circuit in accordance with the present invention.
Figure 2B:
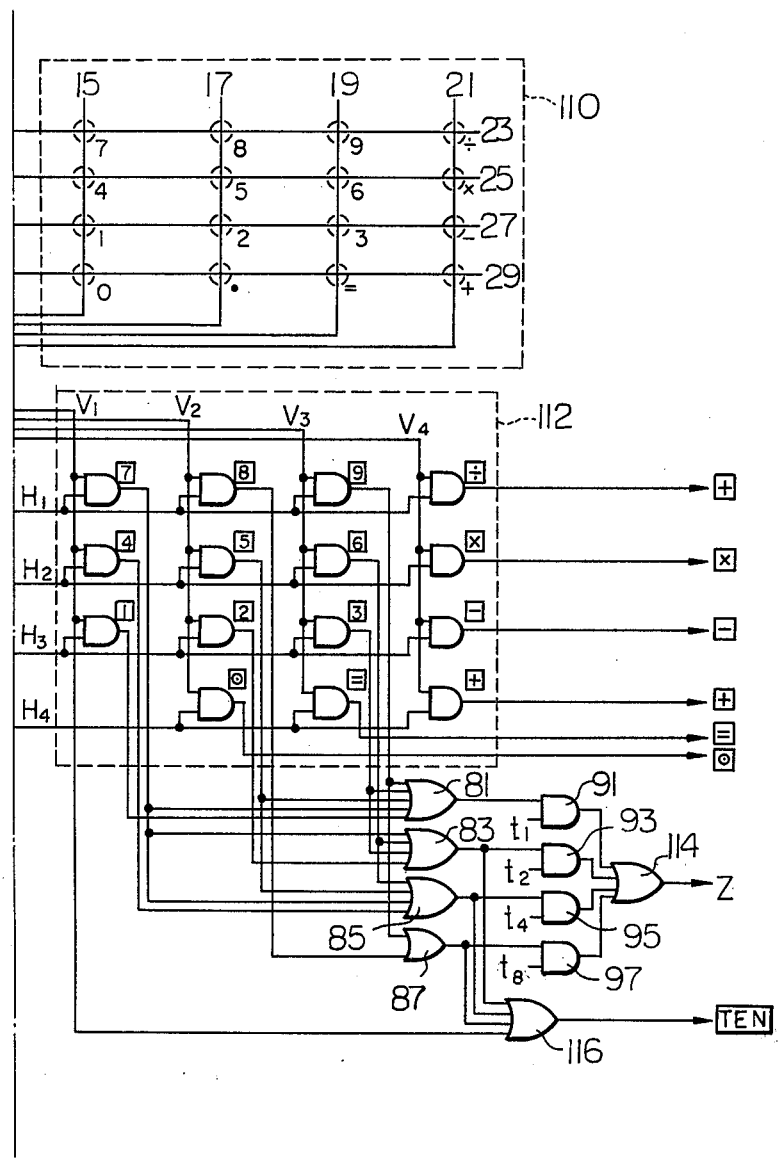

FIG. 2 shows a keyboard contact matrix 110 and input circuits for that keyboard matrix. Rows of interconnected key contacts, referred to hereinafter as matrix rows, 23, 25, 27 and 29, are connected to switching elements 14, 16, 18 and 20 respectively. When these switching elements are set into a conducting condition (referred to hereinafter as the on state) by output signals from NOR gates 22, 24, 26 and 28 respectively, (referred to herein as scanning signals) the corresponding matrix rows are connected to the high potential of the battery of the device, hereinafter referred to as the H level. Columns of interconnected key contacts, referred to hereinafter as matrix columns, are connected to the low potential of the battery of the device (referred to hereinafter as the L level) through resistance elements. Matrix columns 15, 17, 19 and 21 are connected to resistance elements 78, 80, 82 and 84 respectively. For the illustrative embodiment described herein, the resistive elements 78, 80, 82 and 84 consist of MOS devices. The matrix columns are also connected to the data input of data type flip-flop (referred to hereinafter as DEF) 96, and to the data inputs of DFFs 98, 100 and 102 through a combination of AND gates 90, 103 and 106, OR gates 88 and 94, and inverters 86, 92 and 104. This combination serves to establish priorities for the matrix columns, so that if more than one key is depressed simultaneously, only the key in the lowest order column is effective. DEFs 96, 98, 100 and 102 serve to register matrix column state information, and constitute second memory circuits. DFFs 64, 66, 68 and 70 serve as first memory circuits, and correspond to matrix rows 23, 25, 27 and 29 respectively.

Figure 3:
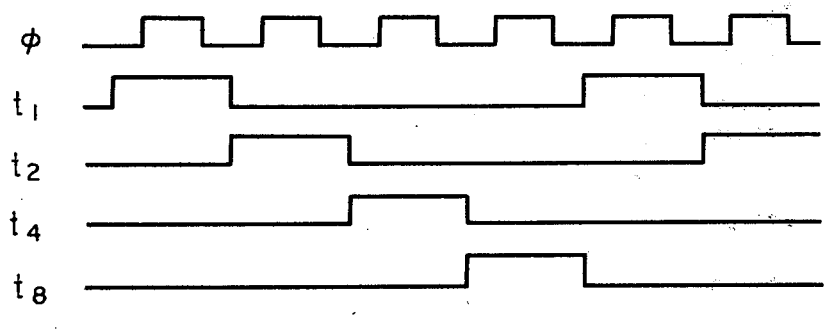
FIG. 3 is a waveform diagram showing the waveforms of signals used in the circuit of FIG. 2.

Timing signals t1, t2, t4 and t8 are applied to inputs of AND gates 40, 42, 44 and 46 respectively, and have the timing relationships shown in FIG. 3.

Figure 4:
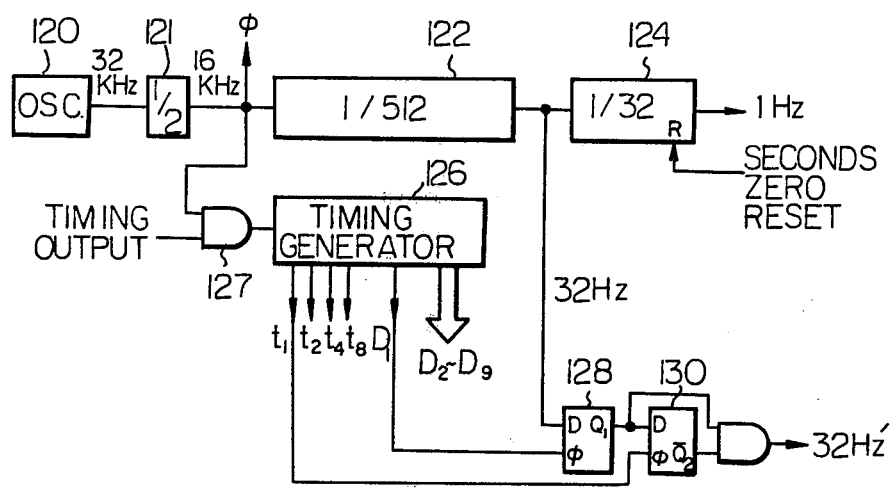
FIG. 4 is a block diagram showing a frequency standard, frequency dividers, flip-flops, gates and a timing generator used to produce timing signals used in the circuit of FIG. 2.

The method of generating timing signals t1, t2, t4 and t8, which are utilized to control the sequence of operations when the portable electronic device is in the calculation mode of operation, will now be described referring to FIG. 4. In FIG. 4, an oscillator serving as a frequency standard generates an output signal of 32 kHz frequency, which is applied to frequency divider 121. Output signal $\phi$ from frequency divider 121, which has a frequency of 16 kHz, is applied to frequency divider 122 and to an input of AND gate 127. Since the division ratio of frequency divider 122 is 1/512, an output signal of 32 Hz frequency is produced, which is applied to the data terminal of DFF 128, and to the input of frequency divider 124. Since the division ratio of divider 124 is 1/32, an output signal of frequency 1 Hz is produced. This signal is utilized as the time unit signal for timekeeping by the device. When resetting of the seconds of the time information to zero is performed in the time correction mode, the various stages in divider 124 are reset to the zero count state by application of a SECONDS ZERO RESET signal to the R terminal.

Figure 6:
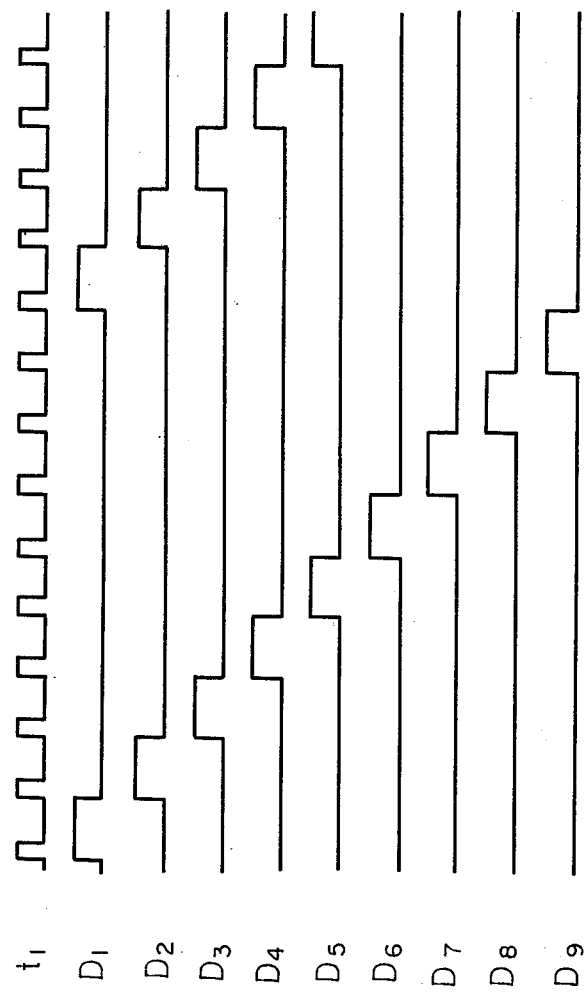
FIG. 6 is a waveform diagram further illustrating the waveforms of signals generated by the circuit of FIG. 4.

The output signals from timing generator 126 are mainly used in the calculation mode of operation, to control the sequence of calculation operations. The relationships between these signals, t1, t2, t4 and t8, and D1 to D9, are shown in the waveform diagrams of FIG. 6 and FIG. 3. Signal $\phi$ is applied to timing pulse generator 126 through AND gate 127. A TIMING OUTPUT signal is produced by a one-shot multivibrator 31 in response to an output of OR gate 33 having its first input coupled to an output of an OR gate 108 and its second input coupled to an output CG of a gate circuit 154 (see FIG. 7). THE TIMING OUTPUT signal applied to the other input of AND gate 127 controls the transfer of $\phi$ pulses to timing generator 126, transfer of $\phi$ pulses being inhibited when TIMING OUTPUT is at the L level, and enabled when it is at the H level. When the TIMING OUTPUT signal is at the low level, the operation of timing generator 126 is stopped.

Figure 5:
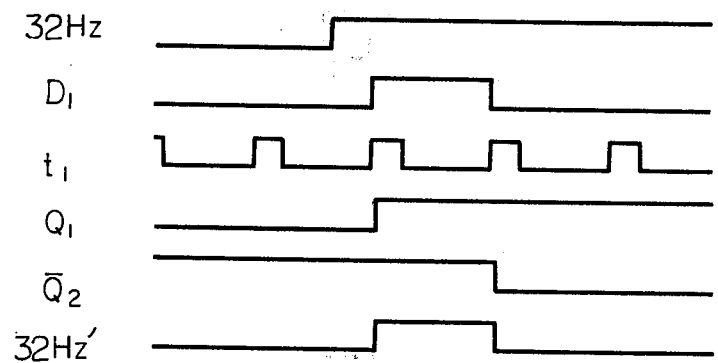
FIG. 5 is a waveform diagram showing the waveforms of signals generated by the circuit shown in FIG. 4.

The 32 Hz output signal from frequency divider 122 is read into DFF 128 by signal D1, as shown in the waveform diagram of FIG. 5, so that output Q1 of DFF 128 goes to the H level. Outputs Q1 is read into DFF 130 by the next leading edge of a t1 pulse to occur after the D1 pulse which caused Q1 to go to the H level. Output $\overline{Q2}$ of DFF 130 thereby goes to the L level, as shown in FIG. 5. Signals Q1 and $\overline{Q2}$ are applied to AND gate 132, which outputs signal 32 Hz'. This signal has a waveform which rises to the H level with the D1 signal, but does not go to the L level until after the trailing edge of the D1 pulse has already gone to the L level.

While the 32 Hz' signal is at the H level, one pulse of each of signals t1, t2, t4 and t8 occurs, consecutively. The duty cycle of the 32 Hz' signal depends upon the frequency of the signal applied to the data terminal of DFF 128. For example, if the frequency of the signal applied to this data terminal were 1 Hz, then the duty cycle of the output signal from AND gate 132 would be 1/4000 approximately.

Referring again to FIG. 2, output of pulses t1, t2, t4 and t8 to produce scanning pulses from AND gates 40, 42, 44 and 46 is controlled by the output from AND gate 36. The CALCULATION signal applied to an input of OR gate 34 goes to the H level when the device is in the calculation mode of operation. The SET signal applied to the other input of gate 34 goes to the H level when the time setting mode is selected. Signal c, applied through inverter 38 to an input of AND gate 36, goes to the H level only when clearing is performed during the calculation mode or when the seconds are reset to zero in the time setting mode.

From the above, it is clear that in either the calculation or the time setting modes, the output of AND gate 36 goes to the H level each time the 32 Hz' signal goes to the H level, but is held at the L level while clearing or seconds resetting to zero is performed. Thus, other than in the latter cases, each time a 32 Hz' pulse occurs, one each of the t1, t2, t4 and t8 pulses is output from AND gates 40, 42, 44 and 46 respectively, in the sequence shown in FIG. 3. Pulses t1 to t8 are applied to the control terminals of switching elements 14, 16, 18 and 20 respectively, through NOR gates 22, 24, 26 and 28, thereby sequentially setting these control elements into the conductive condition. Thus, when the 32 Hz' signal goes to the H level, matrix row 23 goes to the H level during a t1 pulse, due to the action of switching element 14.

When signal 32 Hz' goes to the L level, all of switching elements 14, 16, 18 and 20 go to the off state, and the matrix rows remain in a floating condition until the 32 Hz' signal again goes to the H level.

If a key is depressed, for example the 7 key, then matrix row 23 and matrix column 15 will be connected together. In this condition, when the 32 Hz' signal and the t1 signal both go to the H level, switching element 14 is set to the on state. Current therefore flows from the H potential to the L potential terminals of the battery via switching element 14, matrix row 23, matrix column 15, and impedance element 78 for the duration of the t1 pulse. If the repetition frequency of the t1 signal is 4 kHz, then, the probability of a t1 pulse occurring during a 32 Hz' pulse is approximately 1/500. On the average, therefore, current will only flow through the matrix row and column for 1/500th of the time that the key is depressed. Thus, the power dissipated in order to detect depression of a key is significantly reduced as compared with conventional circuits for keyboard input.

Matrix column 15 is connected to the data terminal of DFF 96, while columns 17, 19 and 21 are connected to inputs of AND gates 90, 103 and 106, whose outputs are applied to the data terminals of DFFs 98, 100 and 102 respectively. In addition, the data terminals of DFF 96, 98, 100 and 102 are connected to the inputs of OR gate 108, whose output is connected to the data terminals of DFFs 64, 66, 68 and 70.

The clock terminals of DFFs 64, 66, 68 and 70, which correspond to matrix rows 23, 25, 27 and 29, are connected to the outputs of AND gates 56, 58, 60 and 62. The $\overline{Q}$ output of each of DFFs 64, 66, 68 and 70 is connected to the inputs of the four AND gates of 56, 58, 60 and 62 which are connected to the other four DFFs. Thus, once one of these DFFs has been set to the ON state, so that its $\overline{Q}$ output is at the L level, clock signals to the other three DFFs are inhibited. The AND product of the 32 Hz' signal, (output from AND gate 36 as described above), with signals t1, t2, t4 and t8 respectively, is output from AND gates 40, 42, 44 and 46 and applied to AND gates 48, 50, 52 and 54 together with signal $\phi$. Thus, pulses with the same timing relationships as those applied to the control terminals of switching elements 14, 16, 18 and 20, but with pulse width equal to the $\phi$ pulses, are applied as clock signals to DFFs 64, 66, 68 and 70 through AND gates 56, 58, 60 and 62.

Accordingly, when a key is depressed in matrix row 23, for example, the next output pulse from NOR gate 22 causes row 23 to go to the H level by the action of switching element 14. As a result, the matrix column corresponding to the key which is depressed will go to the H level at this time. A short time later, the H level output produced by OR gate 108 as a result of the column going to the H level will be read into DFF 64 by the clock pulse output from AND gate 56.

The Q outputs from DFFs 64, 66, 68 and 70 are applied to the inputs of OR gate 74, whose output is applied to an input of OR gate 76. Thus, when a key is depressed, the output of OR gate 74, and hence of OR gate 76, will rise to the H level. Since the output of OR gate 76 is connected to the clock terminals of DFFs 96, 98, 100 and 102, these DFFs register the H level of the column containing the key which has been depressed, on the rising edge of the output from OR gate 76.

The Q output of DFF 71 is normally at the L level, due to the L level applied to its data terminal being read in by successive 32 Hz' pulses. When a key is depressed, causing the output of OR gate 74 to go to the H level, the application of this OR gate 74 output to the S terminal of DFF 71 causes its Q output to be forcibly set to the H level. The trailing edge of the 32 Hz' pulse during which key depression was detected, inverted in inverter 73, is applied to the clock terminal of DFF 75, causing its Q output to go to the H level. This output, signal Key ON, is applied to an input of OR gate 76 thereby ensuring that this gate produces only one pulse (applied to the clock terminals of DFFs 96, 98, 100 and 102) each time a key is depressed.

The outputs from matrix column DFFs 96, 98, 100 and 102, and from matrix row DFFs 64, 66, 68 and 70, are combined in a set of AND gate shown in block 112 in FIG. 2. When a key is depressed, the corresponding AND gate output in block 112 goes to the H level, with the exception of the 0 key, for which no AND gate is required. In addition, when one of the ten keys is depressed, a TEN signal is produced from OR gate 116. The outputs of AND gates in block 112 which correspond to the ten keys are encoded by OR gates 81, 83, 85 and 87. The outputs of these gates represent the value of a key which is depressed, expressed in parallel binary form, and are sequentially scanned by signals, t1, t2, t4 and t8 applied to AND gates 91, 93, 95 and 97. As a result, the numeric value of a key which is depressed is output from OR gate 114, in serial binary form, as data signal Z.

There is a time interval of about 30 ms between each of the 32 Hz' pulses, during which time the effects of switch bounce will disappear. Thus, it is unnecessary to provide additional circuitry for switch bounce suppression, with the keyboard input circuit of the present invention.

When a key is released, the corresponding matrix row DFF will have an L level signal applied to its data terminal, and its Q output is therefore reset to the L level. The output of OR gate 74 goes to the low level, releasing the set condition of DFF 71 so that outputs of DFFs 71, 75, 77 sequentially goes to a low level. In the case of the matrix column DFF (96, 98, 100 or 102), the trailing edge of the Key ON signal, applied to an input of AND gate 72 through inverter 77 causes an H level output from AND gate 72, which resets all of the matrix column DFF Q outputs to L level when a key is released.

When power is switched on, an INITIAL RESET signal is applied to the reset terminals of the matrix row DFFs, thereby resetting their Q outputs to the L level.

Timing pulse generator 126 is actuated by the TIMING OUTPUT signal only when the timing pulses are actually required, in the calculation mode or the time setting mode. When TIMING OUTPUT is the L level, so that the timing signals and the 32 Hz' signal are not being produced, the SET or CALCULATION signal applied to AND gate 32 through OR gate 34, and the TIMING OUTPUT signal applied through inverter 30, together cause the output of AND gate 32 to go to the H level. Since this output is applied to NOR gates 22, 24, 26 and 28, L level signals are applied to the control terminals of switching elements 14, 16, 18 and 20. Therefore, switching elements 14, 16, 18 and 20 are turned ON and rows 23, 25, 27 and 29 goes to the high level. If a key is depressed, in this condition, then the output of OR gate 108 goes to the H level. This output is used to cause the TIMING OUTPUT signal to go to the H level, so that the timing pulse generator 126 begins to generate the timing signals and the 32 Hz' signal. Thereafter, the operation is as previously described.

Figure 7:
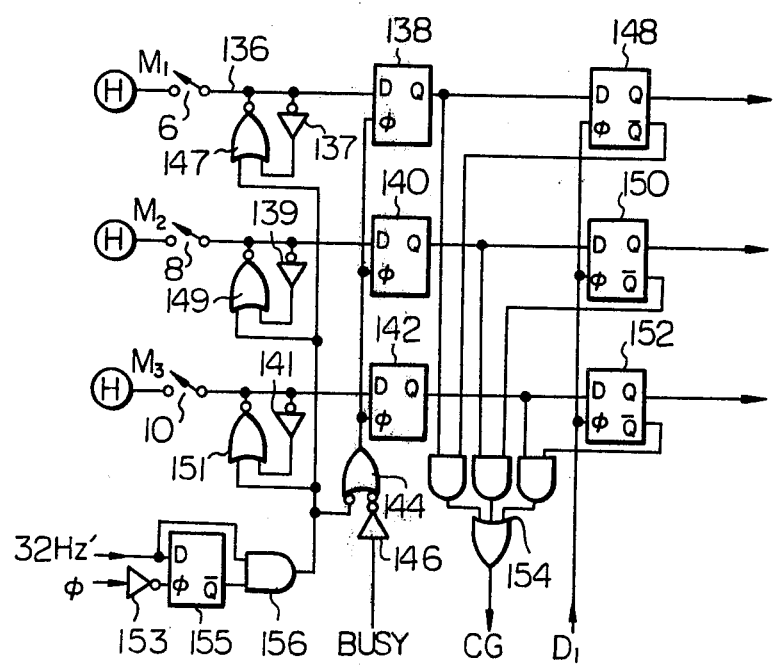
FIG. 7 is a simplified circuit diagram of input circuits of external control members in accordance with the present invention.

FIG. 7 shows input circuits for external control members of the preferred embodiment of the present invention. Numerals 6, 8 and 10 represent the switch contacts of the mode selection, time setting lock and clear control members respectively whose functions have been described above. When member 6, 8 or 10 is actuated, an H level signal is applied to the data terminal of the corresponding DFF 138, 140 or 142. The output of AND gate 156 consists of reset pulses with a frequency of 32 Hz and pulse width equal to the period of the φ pulses. The leading edge of each of the output pulses from AND gate 156 occurs just after the leading edge of a corresponding 32 Hz pulse. These output pulses are inverted and applied to the clock terminals of DFF 138, 140, 142 through NAND gate 144. These DFFs serve as a first stage memory circuit.

Timing pulses D1 are applied to the clock terminals of DFFs 148, 150 and 152, which serve as a second stage memory circuit.

The output pulses from AND gate 156 are also applied through NOR gates 147, 149 and 151 to the data terminals of the first stage memory circuit DFFs, to set these to the L level so long as the corresponding external actuating member is not actuated. Inverters 137, 139 and 141 serve to latch the said data terminals at the L level between output pulses from AND gate 156.

If, for example, the contacts of member 6 are closed, the potential of line 136 is forcible raised to the H level, irrespective of the pulses applied to NOR gate 147. The clock pulses applied to DFF 138 therefore cause its Q output to go to the H level. Since there is a period of the order of 30 ms between each of these clock pulses, the effects of any switch bounce resulting from the contacts being closed will have disappeared by the time the next clock pulse is applied to DFF 138. Thus, suppression of switch bounce is simply and effectively achieved.

If the device is in the course of a calculation operation, the signal BUSY is at the H level. Output of clock pulses from NAND gate 144 is therefore inhibited, and actuation of external control members 6, 8 or 10 will have no effect. The H level of the output of DFF 138, resulting from actuation of 6, is registered in DFF 148 on the leading edge of the next D1 pulse to occur after detection of actuation by DFF 138. Thus, actuation of 6 results in an H level output from DFF 148 which is synchronized with the timing signals, and which is free from the effects of switch bounce.

With the circuit arrangement shown, it is apparent that output CG of OR gate 154 will go to the H level following actuation of 6, 8 or 10, and will remain at that level until the output from DFF 138, 140 or 142 has been registered in the corresponding DFF 148, 150 and 152. Signal CG serves as a command signal which causes timing pulse generator 126 to begin generating timing pulses. This is necessary since the timing pulse generator is only activated when these timing pulses are actually required, in order to minimize power consumption. When the timing pulse generator is activated by signal CG, a D1 pulse is subsequently produced, causing the Q output of DFF 148, 150 or 152 corresponding to the actuated control member to go to the H level on the leading edge of that D1 pulse. Signal CG thereby returns to the L level.

From the above description, it may be understood that the input circuits for keyboard and for external members as illustrated by the preferred embodiment, enable a significant reduction of battery power consumption in a portable electronic device with combined calculator and timepiece functions to be achieved. This is in part due to the fact that the condition of the keyboard contact matrix is periodically examined by means of pulses which can have an extremely low duty cycle. In the intervals between these pulse, if MOS type circuit elements are utilized, the steady-state current drawn from the device battery will be very small indeed. In addition, since the timing pulse generator which produces the said pulses is only activated as a result of a key being depressed (other than during a calculation or time setting operation), the average power required by the timing pulse generator is also very small. The low duty cycle of the said pulses also allows the effects of switch bounce to disappear between the time that key depression is first detected and the occurrance of the next timing pulse. Thus, switch bounce is effectively eliminated without the need to provide additional elements specifically for that purpose.

In the case of the input circuit for external control member, the above remarks are also true. In this case, the provision of first stage and second stage memory circuits enables switch bounce to be suppressed in the first stage, while synchronization with internal timing signals is achieved by means of the second stage circuits.

What is claimed is:

1. In an input circuit for a portable electronic device powered by a battery having first and second potentials, which input circuit has a keyboard having ten keys and function keys to provide numeric signals and function signals, respectively, the improvement comprising:

a frequency standard providing a standard frequency signal;

a key contact matrix comprising a pluraltiy of key contacts and responsive to actuation of said ten keys and said functions keys;

a plurality of matrix columns of said matrix key contact comprising electrical conductors connected to columns of said key contacts;

a plurality of matrix rows of said key contact matrix comprising electrical conductors connected to rows of said key contacts;

a plurality of impedance elements connected between said plurality of matrix columns and the first potential of said battery;

a plurality of electronic switching elements connected between said matrix rows and the second potential of said battery and having control electrodes, respectively;

timing signal generating means responsive to said standard frequency signal for providing a plurality of timing signals;

control signal generation circuit means for generating a control signal when said portable electronic device is set in its predetermined operating mode, said control signal having a duty cycle lower than one half; and a control circuit responsive to said control signal and said plurality of timing signals to generate a plurality of scanning signals which are applied to the control electrodes of said plurality of electronic switching elements, respectively, for thereby sequentially causing each of said plurality of electronic switching elements to enter an electrically conductive state for a limited period of time.

2. In an input circuit for a portable electronic device powered by a battery having first and second potentials, which input circuit has a keyboard having ten keys and function keys to provide numeric signals and function signals, respectively, the improvement comprising:

a frequency standard providing a standard frequency signal;

a key contact matrix comprising a plurality of key contacts and responsive to actuation of said ten keys and said functions keys;

a plurality of matrix columns of said matrix key contact comprising electrical conductors connected to columns of said key contacts;

a plurality of matrix rows of said key contact matrix comprising electrical conductors connected to rows of said key contacts;

a plurality of impedance elements connected between said plurality of matrix columns and the first potential of said battery;

a plurality of electronic switching elements connected between said matrix rows and the second potential of said battery and having control electrodes, respectively;

timing signal generating means responsive to said standard frequency signal for providing a plurality of timing signals;

first control signal generation circuit means for generating a first control signal when said portable electronic device is set in its predetermined operating mode;

a control circuit responsive to said first control signal and said plurality of timing signals to generate a plurality of scanning signals;

second control signal generation circuit means for generating a second control signal in the absence of said plurality of timing signals; and gate circuit means responsive to said scanning signals for thereby sequentially causing each of said plurality of electronic switching elements to enter an electrically conductive state for a limited period of time;

said gate circuit means being responsive to said second control signal to cause all of said plurality of electronic switch elements to enter an electrically conductive state continuously in the absence of said timing signals being applied to said control circuit.

3. The improvement according to claim 2, further comprising a first memory circuit to receive said scanning signals and responsive to said scanning signals to generate a row output signal indicative of a matrix row in which one of said keys has been actuated, and a second memory circuit coupled to said matrix columns to generate a column output signal indicative of a matrix column containing said key which has been actuated.

4. The improvement according to claims 2 or 3, wherein each of said scanning signals comprises a train of electrical pulses having a repetition period that is longer than the duration of a switch bounce condition of intermittent electrical contact of said key contacts occuring following actuation of said keys.

5. The improvement according to claim 3, further comprising first inhibiting gate means to said row output signal for inhibiting more than one of said scanning signals from being concurrently applied to said first memory circuit when said ten keys and said function keys are concurrently actuated, and second inhibiting gate means for inhibiting output signals of said matrix column from being concurrently applied to said second memory circuit when said ten keys and said function keys are concurrently actuated.

6. In a portable electronic device powered by a battery, the improvement comprising:

a frequency standard providing a standard frequency signal;

a frequency divider responsive to said standard frequency signal to provide a plurality of low frequency signals;

timing signal generating means responsive to said low frequency signals to provide a plurality of timing signals;

circuit means responsive to one of said low frequency signals to provide an output signal of a narrower pulse width than that of said one of said low frequency signal;

externally actuated control members;

means responsive to actuation of said externally actuated control members for producing predetermined electrical signals;

first stage memory circuit means responsive to said output signal and said predetermined electrical signals to store said predetermined electrical signals and produce first corresponding outputs; and second stage memory circuit means responsive to one of said timing signals and said first corresponding outputs to store said first corresponding outputs and produce second corresponding outputs, said second corresponding outputs being produced in synchronism with said one of said timing signals.

* * * * *